United States Patent
Lee et al.

(10) Patent No.: US 11,179,757 B2
(45) Date of Patent: *Nov. 23, 2021

(54) METHODS FOR CANNABIS WASTE DISPOSAL

(71) Applicant: Gaiaca, LLC, Gonzales, CA (US)

(72) Inventors: Jonathan Lee, Monterey, CA (US); Garrett Rodewald, Pacific Grove, CA (US)

(73) Assignee: Gaiaca, LLC, Gonzales, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/227,261

(22) Filed: Apr. 9, 2021

(65) Prior Publication Data
US 2021/0229145 A1 Jul. 29, 2021

Related U.S. Application Data

(63) Continuation of application No. 17/075,646, filed on Oct. 20, 2020, which is a continuation-in-part of application No. 16/198,747, filed on Nov. 21, 2018, now Pat. No. 10,876,061.

(60) Provisional application No. 62/590,204, filed on Nov. 22, 2017.

(51) Int. Cl.
*A62D 3/40* (2007.01)
*B09B 3/00* (2006.01)
*B02C 18/00* (2006.01)
*A62D 101/28* (2007.01)

(52) U.S. Cl.
CPC ............. *B09B 3/0075* (2013.01); *A62D 3/40* (2013.01); *B02C 18/0092* (2013.01); *A62D 2101/28* (2013.01)

(58) Field of Classification Search
CPC .... A62D 3/40; A62D 2101/28; B09B 3/0075; B02C 18/0092

USPC ......................................................... 588/321
See application file for complete search history.

(56) References Cited

U.S. PATENT DOCUMENTS

| | | |
|---|---|---|
| 10,876,061 B2 | 12/2020 | Lee et al. |
| 2013/0263597 A1 | 10/2013 | Chauvin |
| 2016/0130762 A1* | 5/2016 | Ramaratnam ............ D21C 9/10 162/129 |
| 2019/0153345 A1 | 5/2019 | Lee et al. |
| 2019/0246591 A1 | 8/2019 | Leo |
| 2020/0102518 A1 | 4/2020 | Calabrese et al. |

OTHER PUBLICATIONS

Colorado Department of Revenue—Marijuana Enforcement Divisions, 1 CCR 212-2, Permanent Rules Related to the Colorado Retail Marijuana Code, Sep. 9, 2013 (144 pages).
Wikipedia "Municipal solid waste" (2006).
U.S. Appl. No. 16/198,747 / U.S. Pat. No. 10,876,061, filed Nov. 21, 2018 / May 23, 2019.
U.S. Appl. No. 17/075,646, filed Oct. 20, 2020.

* cited by examiner

*Primary Examiner* — Edward M Johnson
(74) *Attorney, Agent, or Firm* — Eversheds Sutherland (US) LLP; Christopher C. Bolten; Albert K. Heng

(57) ABSTRACT

Systems and methods for rendering cannabis-related waste materials are provided. The method may include inserting a plurality of cannabis-related waste materials into, for example, a mobile rendering vehicle. The method may further include physically altering the cannabis-related waste materials such that the cannabis-related waste materials are unrecognizable and unusable. The insertion of the cannabis-related waste materials into the mobile rendering vehicle may be recorded and/or the physical alteration (e.g., pulverization) of the cannabis-related waste materials may be recorded via one or more cameras disposed on the mobile rendering vehicle to verify proper insertion and/or alteration of the cannabis-related waste materials.

23 Claims, 7 Drawing Sheets

FIG. 6

METHODS FOR CANNABIS WASTE DISPOSAL

CROSS-REFERENCE TO RELATED APPLICATIONS

This application is a continuation of U.S. patent application Ser. No. 17/075,646, filed Oct. 20, 2020, which is a continuation-in-part of U.S. patent application Ser. No. 16/198,747, filed Nov. 21, 2018, now U.S. Pat. No. 10,876,061, which claims the benefit of priority of U.S. Provisional Application Ser. No. 62/590,204, filed Nov. 22, 2017, the entire contents of each of which are incorporated herein by reference.

FIELD OF USE

The present disclosure is directed to systems and methods for rendering cannabis-related waste materials, e.g., using a mobile rendering vehicle.

BACKGROUND

The cannabis industry, e.g., medical and recreational, encompasses a variety of business such as grow operations, product manufacturers, distributors, dispensaries, and testing laboratories. As the cannabis industry continues to grow, the steps of harvesting and processing cannabis, e.g., marijuana, for extraction, and infusion of products (which include, but are not limited to: edibles, e.g., cookie, brownie, candy, chocolate, gummy, beverage, soda, dessert, caramel, mint, pill, hot sauce, dried fruit, olive oil, and cooking oil; cannabis extract/concentrate; tincture/sublingual strips; topical, e.g., balm, salve, lotion, oil, and bath bomb; joints/blunts/cigarettes; vaporizers, and cannabis applicators) generate large amounts of by-products and waste. Cannabis is a Schedule 1 Controlled Substance, and therefore must adhere to the Federal Controlled Substances Act.

Accordingly, cannabis-related waste materials including cannabis waste (i.e. cannabis plant material), cannabis-infused products, mixed packaging, manufacturing byproducts, grow medium, contaminated disposables, and contaminated cannabis waste must be disposed of in compliance with applicable state laws and regulations. Specifically, cannabis waste may still contain regulated substances, e.g., tetrahydrocannabinol (THC), the chemical responsible for the medical effects of cannabis, and thus must be disposed of in compliance with applicable state laws and regulations. Cannabis waste includes cannabis plant material/biomass such as roots, stalks, stems, leaves, and flowers of the cannabis plant. Cannabis-related wastes materials includes cannabis-infused products with mixed packaging, e.g., glass, plastic, fiber, and metal, manufacturing byproducts, e.g., plant fats, waxes, lipids, and terpenes, non-compostable grow mediums such as rock-wool, contaminated disposables, e.g., personal protective equipment such as nitrile/rubber gloves, batteries, cellulose papers, filters, containers, utensils, and lab ware, and contaminated cannabis waste, e.g., cannabis plant material/biomass, e.g., roots, stalks, stems, leaves, and flowers of the cannabis plant, having high levels of contaminants, e.g., pesticides, fertilizers, solvents (alcohols-based, hydrocarbon-based), chemicals, reactants, and heavy metals.

Currently, 33 states have legalized medical cannabis. Although the Federal Controlled Substances Act controls the substance, individual states are responsible for handling the cultivation, manufacturing, storage, and disposal of cannabis waste. For example, California state law requires that medical and recreational cannabis waste must be made unusable and unrecognizable prior to leaving the licensed premises. Similarly, Illinois state law requires dispensaries to destroy cannabis waste in order to render it unusable, stating an "allowable method to render cannabis waste unusable is by grinding and incorporating the cannabis waste with other ground materials so the resulting mixture is at least 50% non-cannabis waste by volume," and Washington state law recites "[t]he allowable method to render marijuana plant waste unusable is by grinding and incorporating the marijuana plant waste with other ground materials so the resulting mixture is at least fifty percent nonmarijuana waste by volume." As the cannabis industry highly impacts our environment, these cannabis disposal laws are essential for the protection of public health and the environment.

Typically, cannabis waste is mixed with either compostable waste or non-compostable waste to render it unusable and unrecognizable in accordance with state laws and regulations. Suggested compostable waste currently used includes food waste, green waste, green waste, and vegetable based grease and oils, and suggested non-compostable waste currently used includes paper waste, cardboard waste, plastic waste, and soil. However, these compostable and non-compostable wastes may be costly, and may not effectively mix with the grinded cannabis waste such that the result is deemed unusable and unrecognizable.

In addition, cannabis-related wastes materials must also be disposed of according to state and local laws and regulations, and typically are disposed of in an unsustainable manner.

In view of the foregoing drawbacks of previously known systems and methods, there exists a need for more efficient and cost-effective systems and methods for the rendering and disposal of cannabis-related waste materials including cannabis plant material, as well as systems and methods for ensuring proper rendering of the cannabis-related waste materials in compliance with local regulations.

SUMMARY

The present disclosure overcomes the drawbacks of previously-known systems and methods by providing efficient and cost-effective systems and methods for rendering cannabis-related waste materials including cannabis plant material for disposal in accordance with state laws and regulations. For example, a method for rendering cannabis-related waste, e.g., cannabis plant material, cannabis-infused products, mixed packaging, manufacturing byproducts, grow medium, or contaminated disposables, may include obtaining a plurality of cannabis-related waste materials; and physically altering the plurality of cannabis-related waste materials such that the physically altered cannabis-related waste is unrecognizable and unusable.

The method further may include removing liquid from the physically altered cannabis-related waste. In addition, the method may include heating the physically altered cannabis-related waste to at least 150 degrees Fahrenheit for an amount of time sufficient to sterilize and denature the physically altered cannabis-related waste. Accordingly, the heated physically altered cannabis-related waste may be cooled to form a refuse-derived fuel material. The method further may include sterilizing the physically altered cannabis-related waste to remove any pathogens and biohazards from the physically altered cannabis-related waste. In addition, the method may include denaturing the physically altered cannabis-related waste to break down cannabinoids in the physically altered cannabis-related waste. In one embodiment, physically altering the plurality of cannabis-related waste materials may include saturating the plurality of cannabis-related waste materials with a liquid solution, e.g., a dye, such that the saturated cannabis-related waste is unrecognizable and unusable.

In some embodiments, obtaining the plurality of cannabis-related waste materials includes receiving the plurality of cannabis-related waste materials at a mobile rendering vehicle. Accordingly, physically altering the plurality of cannabis-related waste materials may include shredding the plurality of cannabis-related waste materials using a shredder within the mobile rendering vehicle. The shredder may include a synthetic material that prevents corrosion. The method further may include storing the shredded cannabis-related waste within a payload compartment of the mobile rendering vehicle. In addition, the method may include removing liquid from the shredded cannabis-related waste. The method further may include capturing image data using one or more cameras positioned on the mobile rendering vehicle to verify receipt and physical alteration of the plurality of cannabis-related waste materials. Additionally, the image data may be transmitted to a cloud-based server.

Moreover, physically altering the plurality of cannabis-related waste materials such that the plurality of cannabis-related waste materials is unrecognizable and unusable may include physically altering the plurality of cannabis-related waste materials while the mobile rendering vehicle is onsite at a licensed premise. In addition, the method may include transporting the physically altered cannabis-related waste via the mobile rendering vehicle offsite to another location different from the licensed premise for disposal. The method further may include weighing the plurality of cannabis-related waste materials prior to physically altering the plurality of cannabis-related waste materials, and transmitting data indicative of the weight of the plurality of cannabis-related waste materials to a receiver.

In accordance with another aspect of the present disclosure, the system for rendering cannabis-related waste may include a mobile rendering vehicle having an infeed hopper for receiving a blend of a plurality of cannabis-related waste materials, a shredder for pulverizing the blend such that the blend is unrecognizable and unusable, and a plurality of cameras disposed on the mobile rendering vehicle for capturing image data to verify proper receipt and pulverization of the blend. The plurality of cannabis-related waste materials may include at least one of cannabis plant material, cannabis-infused products, mixed packaging, manufacturing byproducts, grow medium, or contaminated disposables. One of the plurality of cameras may be disposed within a vicinity of the shredder for capturing image data of the pulverization of the blend to verify proper pulverization of the blend. The plurality of cameras may transmit the image data to a cloud-based server, e.g., for video sharing.

The mobile rendering vehicle further may include a control panel having a graphical user interface for receiving user input to control one or more parameters, e.g., infeed hopper speed, shredder speed, or cannabis-related waste materials type, of the mobile rendering vehicle. In addition, the mobile rendering vehicle may include a lift arm for inserting the blend into the infeed hopper. For example, the lift arm may engage with a receptacle holding the blend. Additionally, the lift arm may be operatively coupled to a scale for measuring a weight of the blend. The scale may transmit data indicative of the measured weight to a receiver. Accordingly, one of the plurality of cameras may be disposed on the lift arm for capturing image data of the insertion of the blend into the infeed hopper to verify proper receipt of the blend.

The mobile rendering vehicle further may include at least one of a compactor plate or a bridge-breaker for guiding the blend toward the shredder. The shredder may include a synthetic material for preventing corrosion. In addition, the mobile rendering vehicle further may include a payload compartment sized and shaped to receive the pulverized blend. The mobile rendering vehicle may include an auger for guiding the pulverized blend into the payload compartment. Moreover, the mobile rendering vehicle may include a moveable floor for moving the pulverized blend from the payload compartment to outside of the mobile rendering vehicle. Accordingly, one of the plurality of cameras may be disposed in the payload compartment for capturing image data of the pulverized blend within the payload compartment to verify proper pulverization of the blend. The mobile rendering vehicle further may include a liquid storage compartment sized and shaped to store liquid received from the shredder.

In accordance with another aspect of the present disclosure, a method for rendering cannabis-related waste is provided. The method may include inserting a blend having a plurality of cannabis-related waste materials into a mobile rendering vehicle; pulverizing the blend such that the blend is unrecognizable and unusable; and recording the insertion of the blend into the mobile rendering vehicle and the pulverization of the blend to verify proper insertion and pulverization of the blend. For example, the blend may be pulverized while the mobile rendering vehicle is onsite at a licensed premise. Accordingly, the method further may include transporting the pulverized blend via the mobile rendering vehicle offsite to another location different from the licensed premise for disposal. The method further may include weighing the blend prior to pulverizing the blend; and transmitting data indicative of the weight of the blend to a receiver, e.g., to be integrated with shipping documents.

BRIEF DESCRIPTION OF THE DRAWINGS

FIG. 6 illustrates a sample Certificate of Destruction.

DETAILED DESCRIPTION

Cannabis-related waste materials including cannabis waste (i.e. cannabis plant material), cannabis-infused products, mixed packaging, manufacturing byproducts, grow medium, contaminated disposables, and contaminated cannabis waste, must be disposed of in compliance with the governing state laws and regulations, e.g., by rendering it unusable and unrecognizable, for example, as described in U.S. Patent App. Pub. No. 2019/0153345 to Lee, the entire contents of which are incorporated herein by reference. By blending grinded cannabis plant material with at least equal parts of grinded non-cannabis material, wherein at least a portion of the non-cannabis material includes wood shavings, the resulting pre-compost blend is unusable and unrecognizable. In accordance with the principles of the present disclosure, the pre-compost blend resulting from the methods described herein may be revitalized into rich compost, e.g., via the Bokashi method or in-vessel digestion.

In addition, cannabis-related waste materials may be transformed into refuse-derived fuel by pulverizing, heating, sterilizing, denaturing, and cooling the cannabis-related waste materials. In accordance with the principles of the present disclosure, the refuse-derived fuel may be pelletized, compressed, or vacuum-packed-and-sealed, to be used as a renewable energy source.

Figure 1:
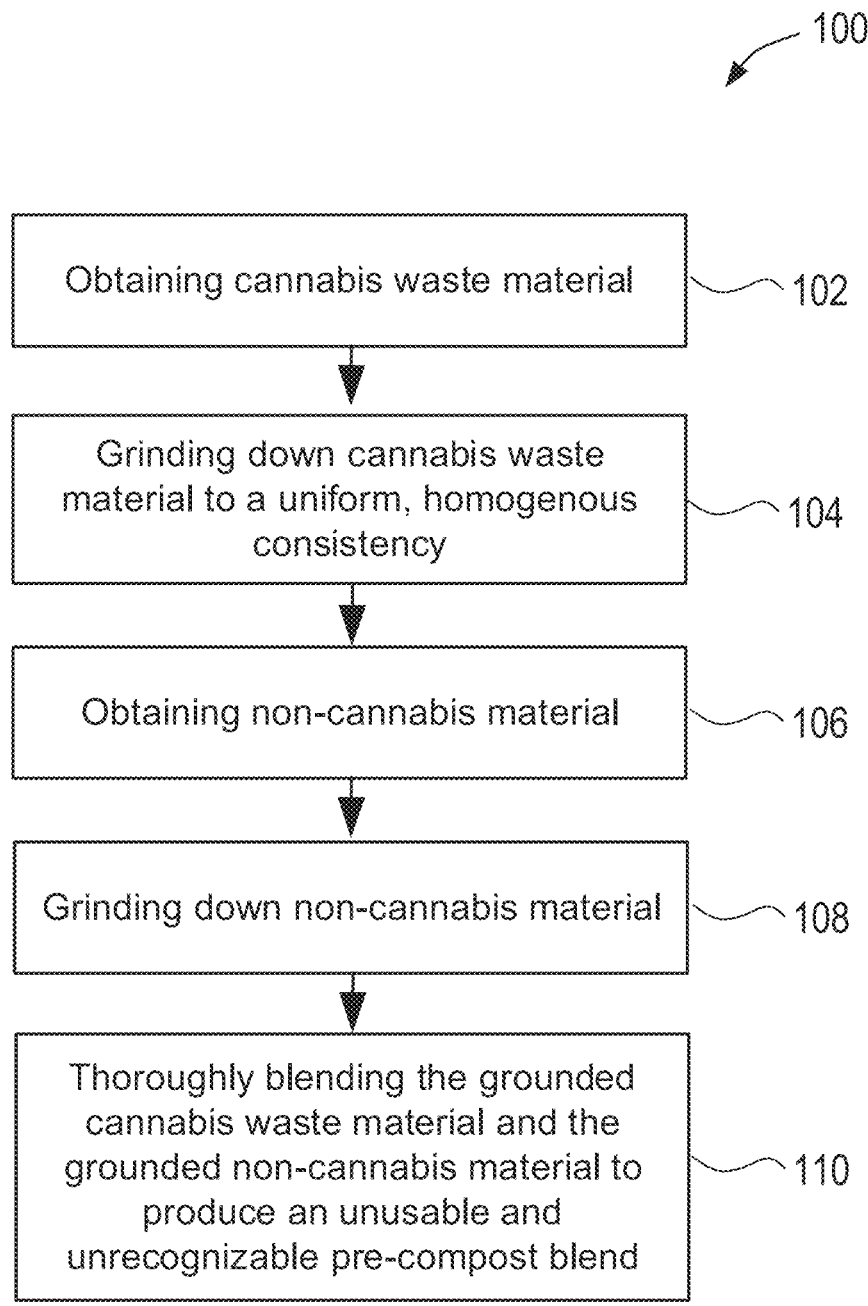
FIG. 1 is a flow chart illustrating the steps of an exemplary method for rendering cannabis waste in accordance with the principles of the present disclosure.

Referring to FIG. 1, exemplary method 100 for rendering cannabis waste-related materials, including cannabis waste is described. At step 102, cannabis waste-related material, e.g., cannabis waste, is obtained. Cannabis waste may include cannabis plant material such as roots, stalks, flower, leaves, and stems of the cannabis plant. Cannabis is considered a "wet green" material, high in Nitrogen.

At step 104, the cannabis waste-related material may be physically altered such as by, for example, pulverizing, compacting, crushing, grinding, shredding, chipping, mixing, blending, burning (combustion), incinerating, carbonizing, gasifying, stabilizing, vitrifying, denaturing, dissolving, and/or saturating/spraying the cannabis waste material. As should be understood, these examples of physical alteration are not mutually exclusive. For example, crushing may include grinding, mixing, and/or blending, etc. In some embodiments, the cannabis waste material may be grinded down, e.g., via a commercial wood chipper or shredder if the cannabis waste material includes hard/rigid cannabis plant material, or a commercial grinder if the cannabis waste material includes soft/malleable cannabis plant material, to a uniform, homogenous consistency. Hard/rigid cannabis plant materials include stalks, stems, sticks, branches, etc., and soft/malleable cannabis plant materials include flowers, buds, leaves, trimmings, etc. The particles of the grinded cannabis waste material may have sizes ranging from dust to a grain of rice. At this stage, the cannabis waste-related material may be sufficiently rendered unusable and unrecognizable.

In addition, the grinded cannabis waste material may be wetted with approximately 1 to 5 gallons of liquid, e.g., water, per approximately 55 gallons of the grinded cannabis waste material, e.g., 1.8%-9.1% water/material ratio, to reduce or prevent dust release. The resulting grinded cannabis waste material/liquid mixture is merely damp, e.g., not a sludge or slurry, and is able to retain its water composition in a solid form. The liquid in the mixture also reduces dust/release of airborne contaminants, provides odor control, as well as aids in the mixing process.

Additionally or alternatively, the cannabis waste-related material may be physically altered via chemical alteration, e.g., saturating the cannabis waste-related material with a liquid solution. For example, the cannabis waste-related material may be saturated/sprayed with a dye, pigment, acid wash, corrosive, caustic, neutralizer, denaturant, solvent, sanitizer, paint, oil, and/or water to render the cannabis waste-related material unusable and unrecognizable.

Optionally, at step 106, non-cannabis material, e.g., an organic compostable material, may be obtained. At least a portion of the non-cannabis material includes wood material, e.g., wood shavings. Different types of wood shavings include wood chips, saw dust, bark, branches, limbs, trunks, stumps, heartwood, sapwood, etc. Wood shavings are a natural, organic material this is easily wetted and retains moisture well. Wood shavings are already broken down, making them easier to grind down further and to mix with the cannabis waste material. In addition, wood shavings provide dark pigments which is similar to that of aged cannabis waste materials, which makes the cannabis waste material even more unrecognizable upon blending. Wood shavings are also light-weight, inexpensive, and readily available. Wood shavings are considered a "dry brown" material, high in Carbon. In addition to, or alternatively, the non-cannabis material may include at least one of corn starch, vegetable starch, polymeric carbohydrate, natural adhesives, dextrin, natural resins, casein (i.e., milk protein), hide-based animal glues, bioadhesives, flour and water (heated), albumen (blood protein), natural wood lignin, organic polymers, or gelatin.

At least another portion of the non-cannabis material may include at least one of yard debris, food waste, coffee grounds, tea leaves, leaves, flowers, seeds, grass, animal feces/manure, soil, vegetables, fruits, pericarp (meat around the seed of a fruit), caryopsis (cereal grain fruit, e.g., wheat, barley, rice), marine mollusk shells, marine algae, hair, insect parts, natural and synthetic fibers, etc.

Optionally, at step 108, the non-cannabis material is grinded down, e.g., via a wood chipper/shredder. The particles of the grinded non-cannabis material may have sizes ranging from dust to a grain of rice. In one embodiment, the same grinder/shredder used to grind down the cannabis waste material may be used to grind down non-cannabis material. In addition, the cannabis waste material and non-cannabis material may be grinded down simultaneously, e.g., using the same grinder/shredder at the same time. For example, the cannabis waste material and non-cannabis material may be grinded down using an industrial multipurpose grinder provided by JWC Environmental®. In this embodiment, step 104 and step 108 may be performed simultaneously such that the cannabis waste material and non-cannabis material are grinded down and blended simultaneously.

In addition, the grinded non-cannabis material may be wetted with approximately 1 to 5 gallons of liquid, e.g., water, per approximately 55 gallons of the grinded non-cannabis material, e.g., 1.8%-9.1% water/material ratio, to reduce or prevent dust release. The resulting grinded non-cannabis material/liquid mixture is merely damp, e.g., not a sludge or slurry, and is able to retain its water composition in a solid form.

Optionally, at step 110, the grinded cannabis waste material and the grinded non-cannabis material are thoroughly blended, e.g., via a commercial soil mixer, such that the blended cannabis waste material and the grinded non-cannabis material completely mixed as will be understood by a person of ordinary skill in the art. For example, the grinded cannabis waste material may be thoroughly blended with at least equal parts of the grinded non-cannabis material in compliance with various state laws and regulations. The grinded cannabis waste material and the grinded non-cannabis material may be thoroughly blended for a time period of at least approximately two minutes, or until thoroughly blended to produce an unusable and unrecognizable pre-compost blend. As will be understood by a person having ordinary skill in the art, if step 104 and step 108 are performed simultaneously such that the cannabis waste material and non-cannabis material are grinded down and blended simultaneously, there is no need to perform step 110 as the grinded cannabis waste material and the grinded non-cannabis material will already be thoroughly blended.

The pre-compost blend is "unrecognizable" in that the cannabis plant material is rendered indistinguishable from any other plant material as will be understood by a person of ordinary skill in the art. The pre-compost blend is "unusable" in that the cannabis waste material generated from cultivation, manufacturing, retail, testing lab, or distribution has no further use or value in that particular process, such that is not attractive or desirable for use for, e.g., smoking, eating, manufacturing, packaging, etc. Additionally, unusable cannabis waste material that has been altered in its physical and/or chemical state, has reduced or no medical and/or psychoactive properties compared to those of unaltered cannabis product.

In addition, the pre-compost blend may be wetted with approximately 1 to 5 gallons of liquid, e.g., water, per approximately 55 gallons of the pre-compost blend, e.g., 1.8%-9.1% water/material ratio, to reduce or prevent dust release. The resulting pre-compost blend/liquid mixture is merely damp, e.g., not a sludge or slurry, and is able to retain its water composition in a solid form. The pre-compost blend will also begin to break down more quickly if damp.

In addition, the pre-compost blend may be further rendered into compost via, e.g., the Bokashi method or in-vessel digestion as will be understood by a person having ordinary skill in the art. The high Carbon content of the wood material and the high Nitrogen content of the cannabis waste material results in a high quality pre-compost blend for creating compost. Therefore, the pre-blend compost may be revitalized into compost, e.g., ready-to-use-soil.

As will be understood by a person having ordinary skill in the art, other suitable mixers and grinders include cement mixers, soil mixers, soil batch mixers, conical mixers, paddle mixers, mortar mixers, drum and barrel mixers, grain mixers, compost screeners, rototillers, commercial food/culinary mixers, rotor bar mixers, dispersion mixers, soil grinders, feed grinders, grain grinders, commercial food/culinary grinders, meat grinders, and wood grinder, etc.

Figure 2:
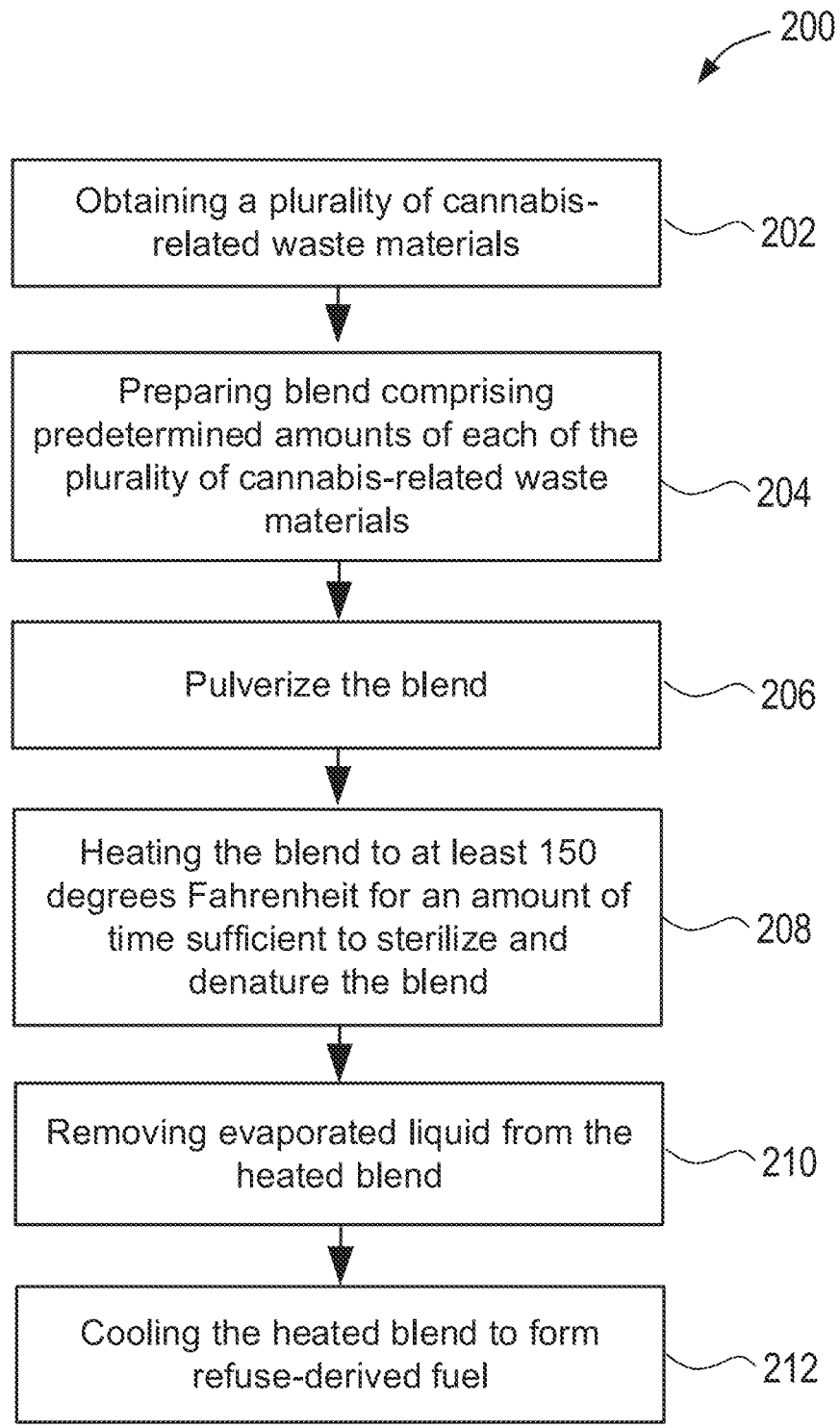
FIG. 2 is a flow chart illustrating the steps of an exemplary method for rendering cannabis-related waste in accordance with the principles of the present disclosure.

Unlike cannabis plant material, not all cannabis-related waste materials are compostable. Thus, referring now to FIG. 2, exemplary method 200 for rendering cannabis-related waste materials is described. At step 202, a plurality of cannabis-related waste materials is obtained, e.g., collected from cannabis operators such as testing labs, distributors, dispensaries, microbusinesses, cannabis cultivators, nurseries, processors, and manufacturers of cannabis products. Cannabis-related waste materials may include cannabis waste (i.e. cannabis plant material), cannabis-infused products, mixed packaging, manufacturing byproducts, grow medium, contaminated disposables, and contaminated cannabis waste. For example, cannabis-infused products include: edibles, e.g., cookie, brownie, candy, chocolate, gummy, beverage, soda, dessert, caramel, mint, pill, hot sauce, dried fruit, olive oil, and cooking oil; cannabis extract/concentrate; tincture/sublingual strips; topical, e.g., balm, salve, lotion, oil, and bath bomb; joints/blunts/cigarettes; vaporizers, and cannabis applicators. Mixed packaging includes glass, plastic, fiber, and metal. Manufacturing byproducts include plant fats, waxes, lipids, and terpenes. Non-compostable grow mediums include rock-wool. Contaminated disposables (i.e., disposable items contaminated with cannabis constituents such as cannabinoids) include personal protective equipment such as nitrile/rubber gloves, cellulose papers, filters, containers, utensils, and lab ware. Contaminated cannabis waste includes cannabis plant material/biomass, e.g., roots, stalks, stems, leaves, and flowers of the cannabis plant, having high levels of contaminants, e.g., pesticides, fertilizers, solvents (alcohols-based, hydrocarbon-based), chemicals, reactants, and heavy metals, making the cannabis waste unsuitable for compost. The cannabis-infused products may be removed from its packaging prior to processing.

At step 204, a blend of the plurality of cannabis-related waste materials is prepared using a predetermined amount of each of the cannabis-related waste materials obtained. For example, the blend may include, 20% cannabis plant material, 20% cannabis-infused products, 20% mixed packaging, 20% grow medium, 20% contaminated disposables. As will be understood by a person having ordinary skill in the art, the amount of each of the plurality of cannabis-related waste materials obtained may be selected to control moisture content, liquid state (solid or liquid), or organic or inorganic content, to create a more balanced, efficient mixture for processing. Prior to preparing the blend, the plurality of cannabis-related waste materials obtained may be organized based on preselected attributes of each of the plurality of cannabis-related waste materials, e.g., cannabis plant material, cannabis-infused products, mixed packaging, manufacturing byproducts, grow medium, contaminated disposables, and contaminated cannabis waste.

At step 206, the blend is physically altered, e.g., pulverized, such that the blend is unrecognizable and unusable. For example, the blend may be loaded into a sealed chamber of a thermokinetic waste converter having a high-speed rotor designed to pulverize the blend. The blend may be loaded into the thermokinetic waste converter either manually or automatically depending on the size of the converter. Upon operation of the thermokinetic waste converter, the high-speed rotor and steel teeth within the thermokinetic waste converter pulverizes the blend, e.g., to the size of a grain of rice.

Optionally, at step 208, the pulverized blend is heated to at least 150 degrees Fahrenheit, e.g., at least 200 or 300 degrees Fahrenheit. Specifically, the high-speed rotor of the thermokinetic waste converter is designed to convert kinetic energy to thermal energy to heat the blend via friction. Water in the form of hot steam may be introduced into the sealed chamber of the thermokinetic waste converter to achieve higher temperatures, e.g., at least 300 degrees Fahrenheit. The blend is held within the sealed chamber of the thermokinetic waste converter and heated for, e.g., up to 30 minutes, such that the high temperature within the sealed chamber of the thermokinetic waste converter sterilizes and denatures the blend. For example, the high temperature sterilizes the blend such that any pathogens and biohazards are removed from the blend. In addition, the high temperature denatures the blend by breaking down cannabis constituents such as cannabinoids including tetrahydrocannabinol in the blend. Due to the high temperatures within the sealed chamber of the thermokinetic waste converter during heating, liquid evaporated from the heated blend may be collected at step 210. For example, the liquid may be collecting into a separate holding container for later disposal/treatment. As will be understood by a person having ordinary skill in the art, liquid evaporated from the heated blend may be collected during the heating step of 208.

Optionally, at step 212, the sterilized and denatured blend is cooled to a suitable temperature within the sealed chamber of the thermokinetic waste converter. Steps 206, 208, and 212 may all occur within the sealed chamber of the thermokinetic waste converter, thus avoiding having to transfer the blend during processing. The result of steps 206, 208, 210, and 212 is a refuse-derived fuel material greatly reduced in size, weight, water content, and overall environmental impact. The refuse-derived fuel material is described as a fuzz or fluff, similar to pet bedding, cotton, blown-in insulation, or spill absorbent. The resulting refuse-derived fuel material is reduced in volume by up to 80%, and in weight by up to 50%, yet retains its full calorific value such that it may be used as a renewable energy source. For example, after the refuse-derived fuel material has cooled, it may be discharged into a separate holding cell, where it may then be pelletized, compressed into bricks or bales for easier storage, or vacuum-packed-and-sealed, depending on its future use, thereby further reducing its environmental impact size. The resulting product may replace fossil fuels in traditional power plants that produce electricity, or may be used in cement kilns, gasification modules, or pyrolysis plants. Method 200 achieves recycling mandates and renders the plurality of cannabis-related waste materials into a renewable energy source in a clean and effective manner, beyond that which is required by state regulations.

Figure 3:
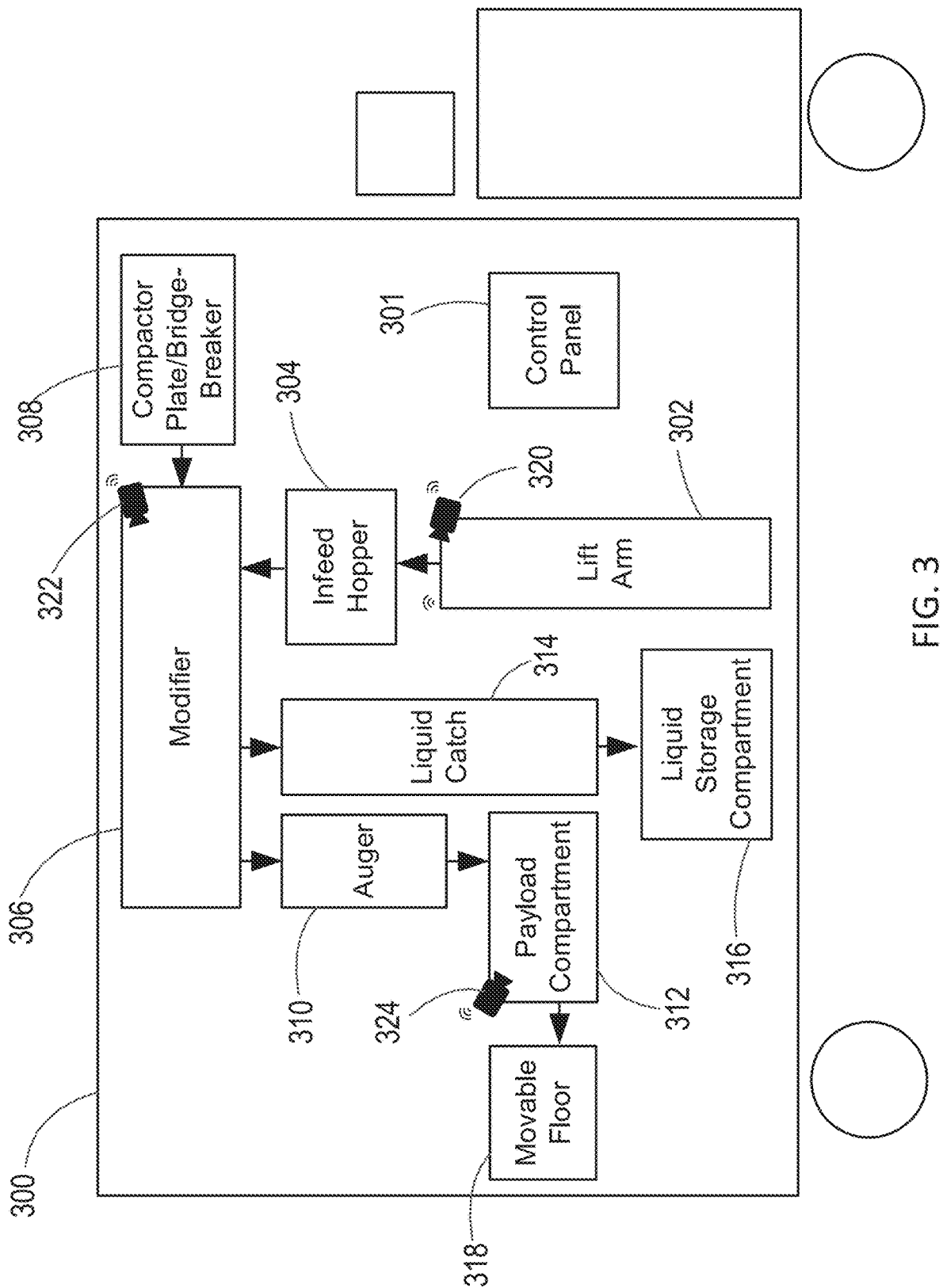
FIG. 3 is a schematic of a mobile rendering vehicle for rendering cannabis-related waste constructed in accordance with the principles of the present disclosure.

Referring now to FIG. 3, mobile rendering vehicle 300 for rendering cannabis-related waste materials, e.g., feedstock, is provided. Mobile rendering vehicle 300, e.g., an Automated Rendering Vehicle (ARV), is a state-of-the-art, mobile destruct truck, customized specifically to meet cannabis industry needs. Mobile rendering vehicle 300 may be equipped with a high-powered, on-board shredder, and is capable of processing a wide range of materials down to, e.g., a ¼-inch in size, or smaller. Mobile rendering vehicle 300 is both clean and efficient, and non-intrusive and secure. Moreover, to meet and exceed State Regulatory Requirements, e.g., Title 16 CCR, Division 42 "Bureau of Cannabis Control (BCC)," and Title 17 CCR, Division 1 "Manufactured Cannabis Safety Branch," strategically positioned in-vehicle cameras may capture the entire rendering process to ensure compliance with local regulations.

As shown in FIG. 3, mobile rendering vehicle 300 may include control panel 301, lift arm 302, infeed hopper 304, modifier 306, compactor plate and/or bridge-breaker 308, auger 310, payload compartment 312, liquid catch 314, liquid storage compartment 316, movable floor 318, and a plurality of cameras, e.g., cameras 320, 322, 324. Control panel 301 may include a graphical user interface configured to receive user input, such that the user may start/stop operation of mobile rendering vehicle 300, and/or adjust one or more parameters of mobile rendering vehicle 300. For example, the user may adjust via control panel 301 infeed hopper speed and/or shredder speed. In addition, control panel 301 may have programmed parameter settings selectable based on the cannabis-related waste materials type. For example, the user may select a specific operation mode based on whether the cannabis-related waste materials includes plant material/light debris, dry edible goods, wet/tacky edible goods, hard material/bulky debris, etc. Accordingly, upon selection of the desired mode based on the cannabis-related waste materials type, mobile rendering vehicle 300 will properly render the feedstock, e.g., blend of cannabis-related waste materials, unrecognizable and unusable. Control panel 301 may be positioned on mobile rendering vehicle 300 in an easily accessible area, e.g., on an exterior side of mobile rendering vehicle 300, and may include a cover to protect control panel 301 when not in use. Additionally, control panel 301 may be actuated to process and print records of the rendering as proof of compliance.

Lift arm 302 may be positioned along an exterior side of mobile rendering vehicle 300 for hoisting the blend into infeed hopper 304. The blend of cannabis-related waste materials may be contained within a receptacle bin, and lift arm 302 may releasably engage with the receptacle to hoist the receptacle, e.g., via a chain driven lift, from the ground toward and into infeed hopper 304. For example, lift arm 302 may have a plurality of grasping arms, e.g., hydraulic clamp, that transition between an open and closed configuration, such that, in the closed configuration, the receptacle is securely engaged with lift arm 302. Moreover, lift arm 302 may be operatively coupled to an electronic scale for measuring the weight of the blend in the receptacle. The scale may transmit, e.g., wirelessly via WiFi or Bluetooth technology, data indicative of the weight of the blend to a receiver, e.g., for efficient integration with shipping documents, as described in further detail with regarding to FIG. 6. In addition, camera 320 may be disposed on lift 302 to capture image data of lift arm 302 hoisting the receptacle/feedstock into infeed hopper 304 to ensure that the feedstock is properly inserted into mobile rendering vehicle 300. Camera 320 may also capture image data of personnel operating control panel 301 to verify proper personnel presence and use of control panel 301.

Infeed hopper 304 is sized and shaped to receive at least a portion of the receptacle hoisted by lift arm 302, such that the blend within the receptacle may be received within the interior of mobile rendering vehicle 300, e.g., in a feedstock compartment containing modifier 306. For example, a railing used to by lift arm 302 to hoist the receptacle vertically along mobile rendering vehicle 300 may extend through infeed hopper 304 into the feedstock compartment. Moreover, infeed hopper 304 may have a plurality of flexible covers that protect the feedstock compartment from external elements, and permit lift arm 302 holding the receptacle to move therethrough into the feedstock compartment.

Modifier 306 may physically alter the blend to render the blend unusable and unrecognizable in the manner described herein. For example, modifier 306 may be a shredder that utilizes a high-speed cutting rotor and metal teeth, e.g., stainless steel, to pulverize and process the blend. The shredder may be composed of strategically positioned stainless steel teeth on a rotating shaft that cuts against a stationary knife edge. The shredder may include a synthetic material lining for preventing corrosion of the metal teeth of the shredder. Moreover, mobile rendering vehicle 300 may include one or more guides 308, e.g., a compactor plate and/or a bridge-breaker, disposed within the feedstock compartment for guiding the blend towards the shredder. For example, a compactor plate may be used to guide/move the blend into the shredder on a two-dimensional plane, and a bridge-breaker may be used to guide/move the blend into the shredder on a three-dimensional plane, e.g., from top to bottom within the feedstock compartment. In addition, camera 322 may be disposed within the feedstock compartment to capture image data of the shredder pulverizing the blend to ensure that the blend within the feedstock compartment is properly moved into modifier 306. Alternatively, modifier 306 may be a compartment for physically altering the blend via saturation with a liquid as described above. For example, modifier 306 may receive the blend and apply a liquid to the blend to render the blend unrecognizable and unusable.

Payload compartment 312 may be sized and shaped to receive the pulverized blend from modifier 306, e.g., via gravity. In addition, auger 310 may be used to facilitate movement of the pulverized blend from modifier 306 to payload compartment 312. For example, auger 310 may be a rotatable spiral structure that guides the pulverized blend to payload compartment 312 as auger 310 is rotated. In addition, camera 324 may be disposed within payload compartment 312 to capture image data of the pulverized blend entering payload compartment 312 to ensure that the blend is properly pulverized. Alternatively or additionally, payload compartment 312 may have a reduced sized such that mobile rendering vehicle 300 further includes a cargo area for storage of containers and other equipment and supplies. The cargo area may have a side-mounted lift-gate for easy loading and unloading.

Optional liquid catch 314 and liquid storage compartment 316 may be used to separate and store liquids present in the blend from modifier 306. For example, liquid catch 314 may be positioned underneath modifier 306, and formed of a mesh material having pores large enough to permit liquid to flow therethrough, but small enough to prevent particles of the pulverized blend from passing through. The liquid flowing through liquid catch 314 will be directed to and stored within liquid storage compartment 316. For example, liquid storage compartment 316 may be an onboard storage tank or an awaiting drum fluidly coupled to liquid catch 314 via a hose.

Movable floor 318 may be, e.g., a conveyor belt, for moving the pulverized blend from payload compartment 312 out of mobile rendering vehicle 300. Accordingly, upon arrival at solid-waste facility, movable floor 318, may push processed feedstock out of mobile rendering vehicle 300. As shown in FIG. 3, cameras 320, 322, 324 may transmit image data to, e.g., a cloud-based server, via a wireless connection, e.g., internet, WiFi or Bluetooth connection, for video sharing to ensure proper receipt and pulverization of the blend.

Figure 4:
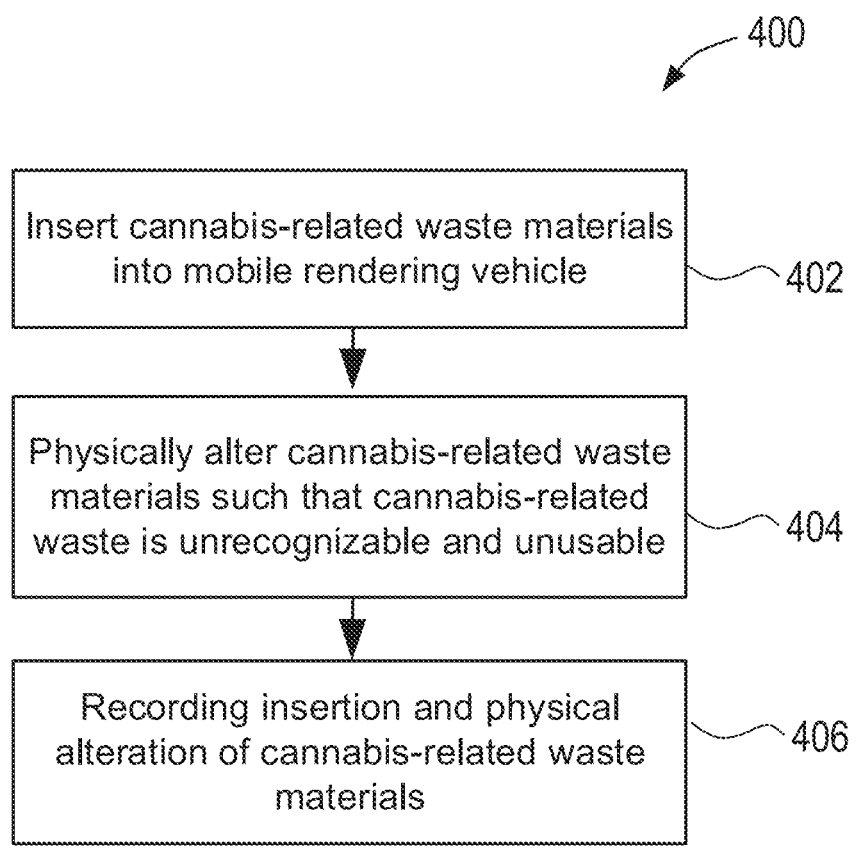
FIG. 4 is a flow chart illustrating the steps of an exemplary method for rendering cannabis-related waste via a mobile rendering vehicle.
Figure 5A:
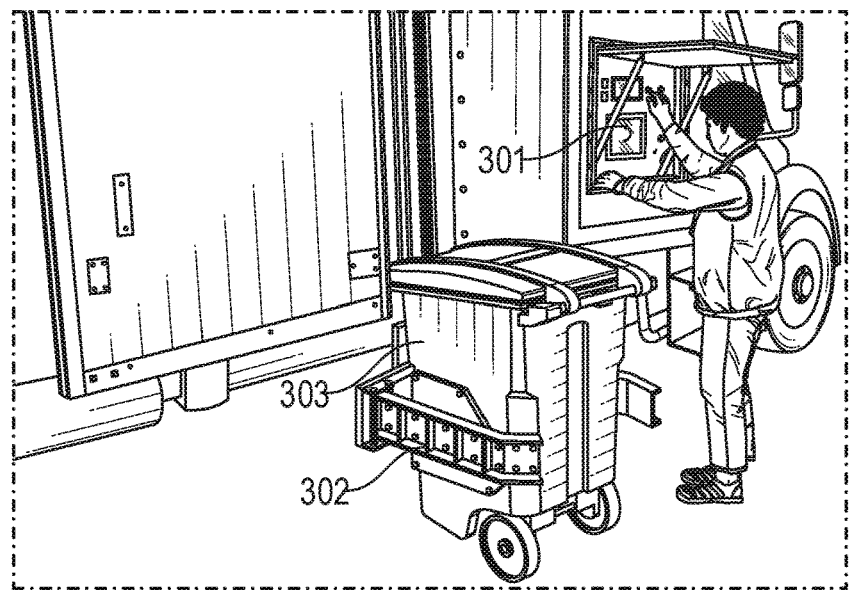
FIGS. 5A to 5F illustrates various steps of an exemplary method for rendering cannabis-related waste via a mobile rendering vehicle.

Referring now to FIG. 4, exemplary method 400 for rendering cannabis-related waste materials via mobile rendering vehicle 300 is described. Some of the steps of method 400 may be further elaborated by referring to FIGS. 5A to 5F. At step 402, a plurality of cannabis-related waste materials may be inserted into mobile rendering vehicle 300 via lift arm 302 and infeed hopper 304 as described above. As shown in FIG. 5A, mobile rendering vehicle 300 may be transported to an onsite location at a licensed premise, e.g., lawful property used/owned by a licensed distributor of cannabis-related products having cannabis-related waste materials to be disposed of.

Figure 5B:
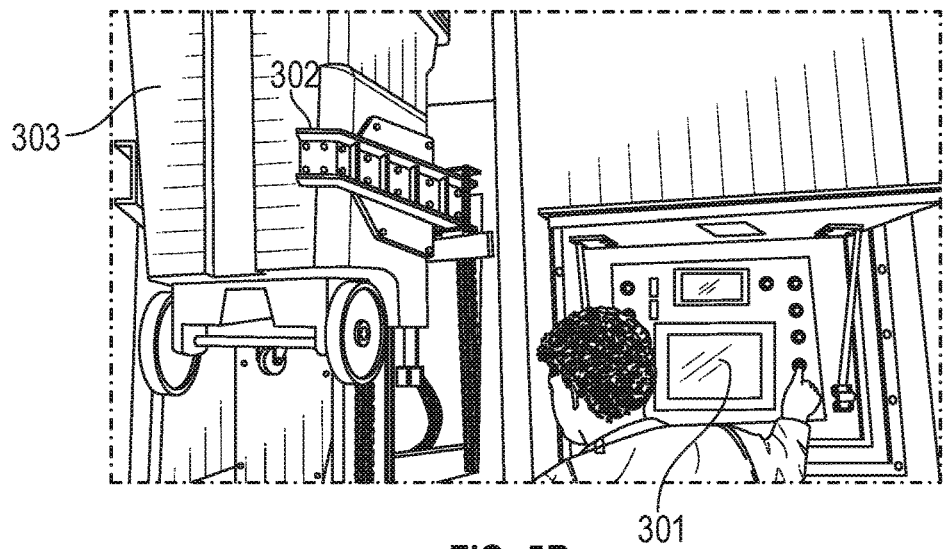
Figure 5C:
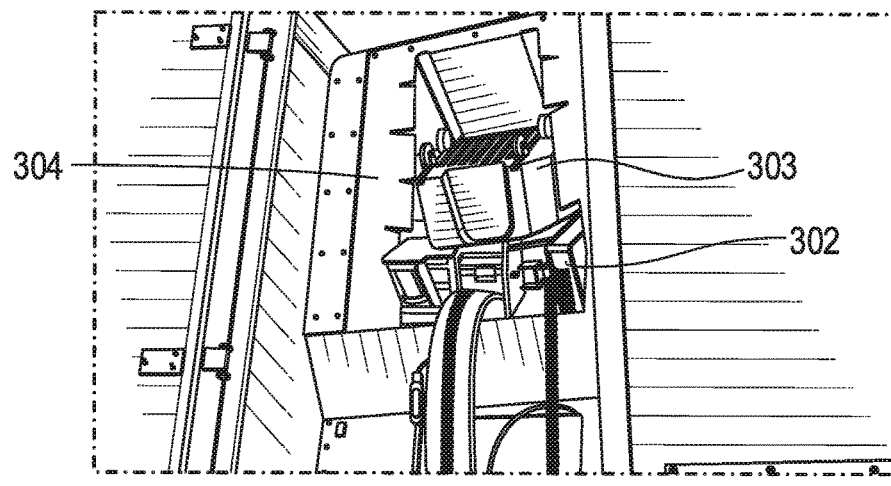
Figure 5D:
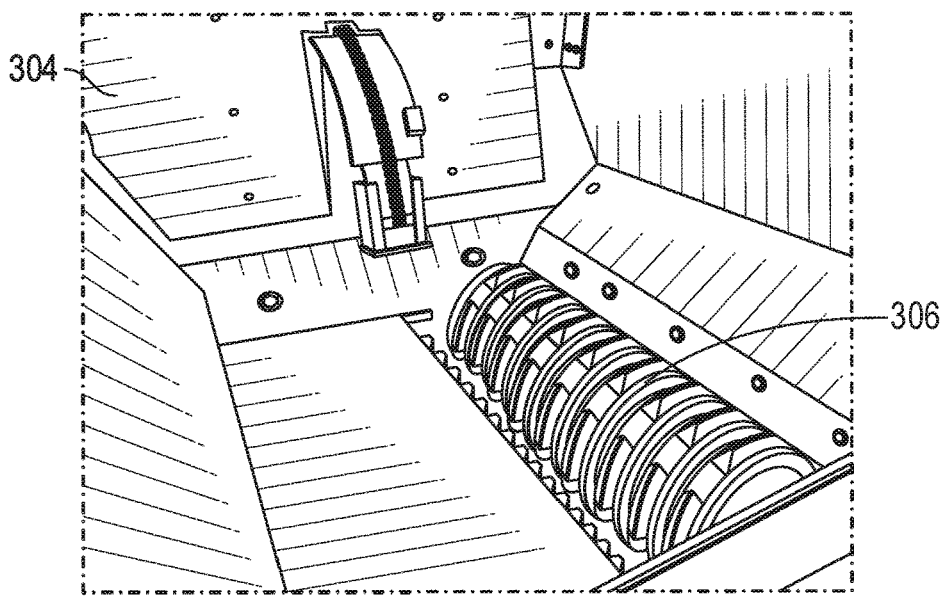

Upon arrival, mobile rendering vehicle 300 may be parked in the designated Temporary Staging Area at the onsite location. The user/personnel may access the waste storage area at the onsite location, and a clear path of travel to the Temporary Staging Area. The user/personnel may then collect and relocate the receptacle bin(s) containing the cannabis-related waste materials from the waste storage area to the Temporary Staging Area, in preparation for destruction. The receptacle may be engaged by lift arm 302 as shown in FIG. 5A. The user/personnel may operate mobile rendering vehicle 300 via control panel 301 and select, e.g., start/stop, infeed hopper speed, shredder speed, and/or a preselected mode based on cannabis-related waste materials type. As shown in FIG. 5B, upon actuation of mobile rendering vehicle 300 via control panel 301, lift arm 302 hoists the receptacle upward toward infeed hopper 304. FIG. 5C shows lift arm 302 moving the receptacle into infeed hopper 304. The interior of the feedstock compartment having modifier 306 therein for receiving the cannabis-related waste materials from the receptacle is shown in FIG. 5D.

Figure 5E:
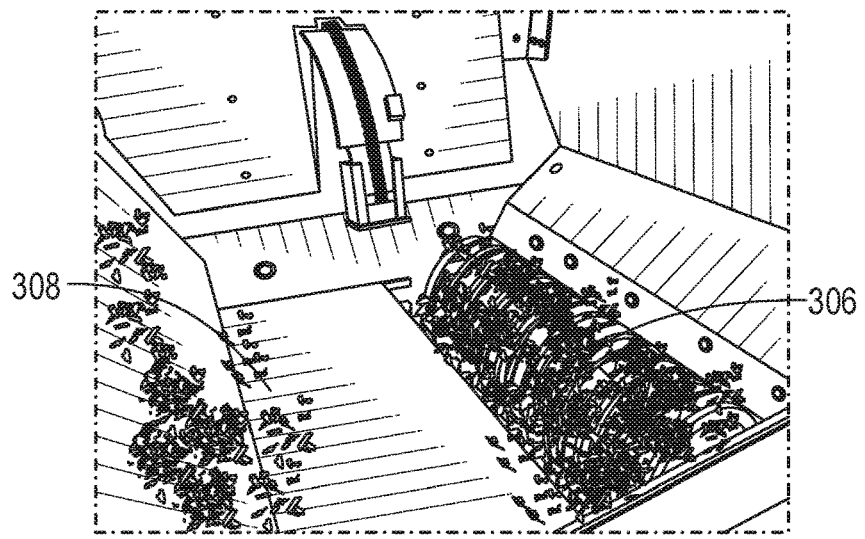
Figure 5F:
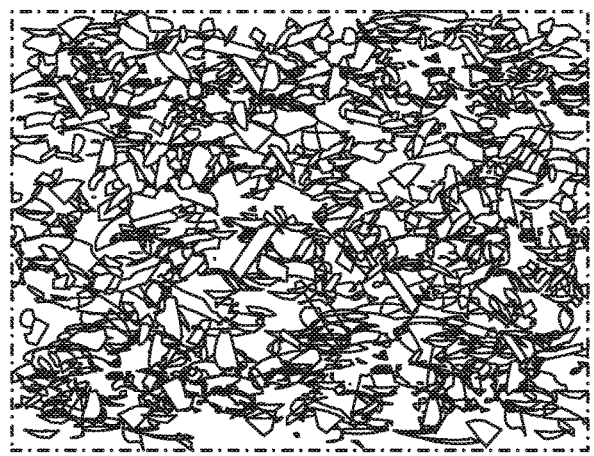

At step 404, the cannabis-related waste materials are physically altered, e.g., pulverized via modifier 306, as shown for example in FIG. 5E, until the cannabis-related waste materials are unrecognizable and unusable, as shown for example in FIG. 5F. Additionally or alternatively, the cannabis-related waste materials may be physically altered prior to introduction into mobile rendering vehicle 300. For example, a solution, e.g., a dye, may be applied to the cannabis-related waste materials to render it unrecognizable and unusable. Mobile rendering vehicle 300 may accept the unrecognizable and unusable cannabis-related waste materials for disposal.

In the example where mobile rendering vehicle 300 includes a shredder, compactor plate and/or bridge-breaker 308 may guide the cannabis-related waste materials into the shredder. The cannabis-related waste materials may remain in the feedstock compartment and be pulverized by the shredder until it has reached a pre-specified particle size, e.g., small enough to pass through a steel screen. Insertion of the cannabis-related waste materials into mobile rendering vehicle 300 as well as pulverization of the cannabis-related waste materials via the shredder may be recorded via strategically placed cameras, e.g., cameras 320, 322, at step 406, which may occur simultaneously with steps 402 and 404. Moreover, as described above, additional cameras, e.g., camera 324, may record additional parts of the rendering process such as when the pulverized cannabis-related waste materials enter payload compartment 312 for verification that the cannabis-related waste materials have been properly pulverized. The image data recorded may be transmitted, e.g., to a cloud-based server, for video sharing to ensure that the cannabis-related waste materials are properly received and pulverized by mobile rendering vehicle 300 to an unrecognizable and unusable state in compliance with local regulations.

After the cannabis-related waste materials are pulverized at the onsite location, mobile rendering vehicle 300 having the pulverized cannabis-related waste materials stored therein may be transported offsite to another location different from the licensed premise for disposal, and/or for further treatment as described above. For example, the pulverized cannabis-related waste materials may be transported to a facility where the pulverized cannabis-related waste materials are offloaded from mobile rendering vehicle 300, e.g., via moving floor 318, and may be heated to sterilize/denature the pulverized cannabis-related waste materials, have any remaining liquid evaporated therefrom, and cooled to form a refuse-derived fuel.

Figure 6:
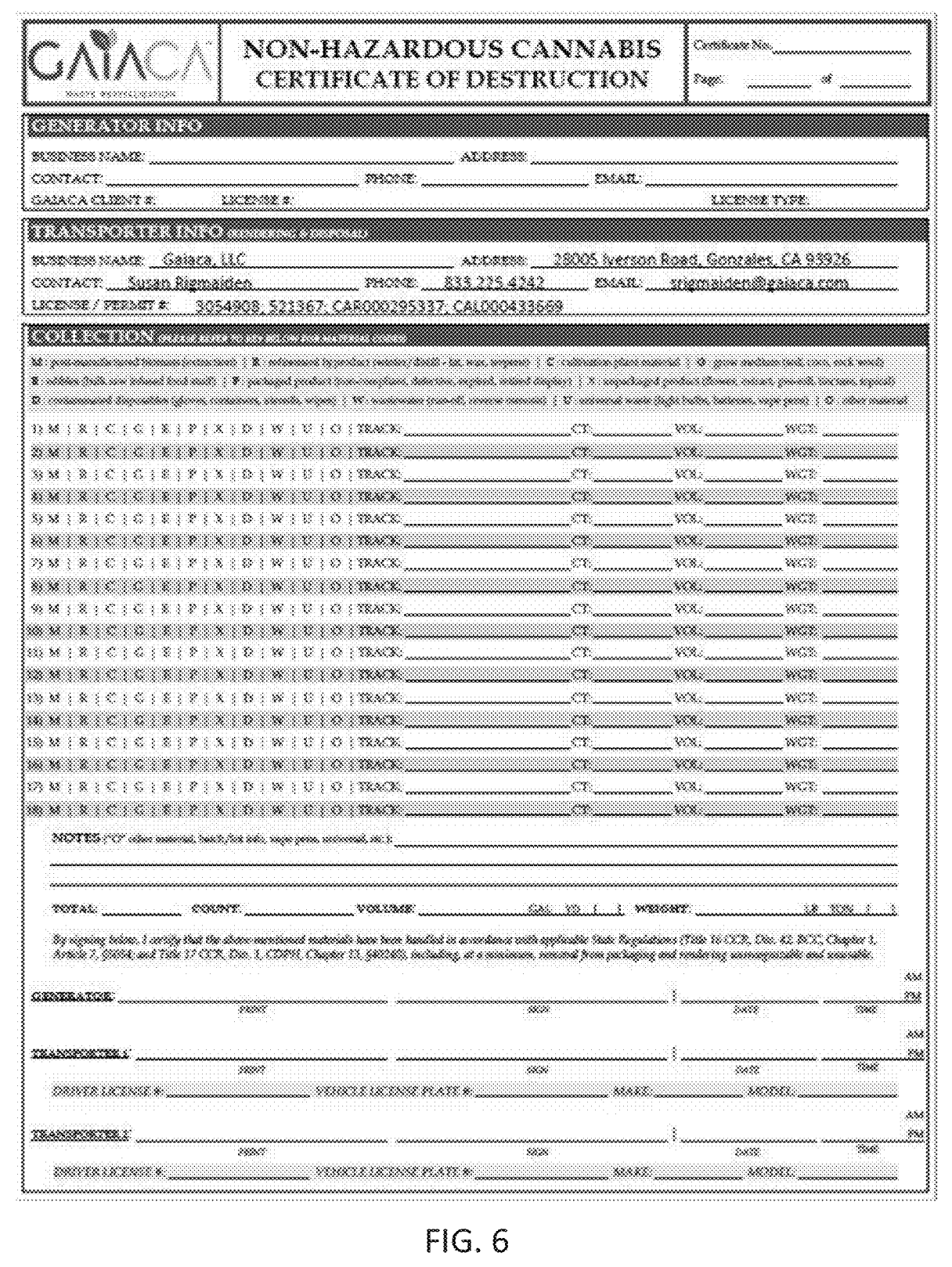

Referring now to FIG. 6, a sample Certificate of Destruction is described. The user/personnel of the Transporter may generate a Certificate of Destruction documenting container/receptacle bin information, as well as verifying any supporting documents provided by the Client/Generator, e.g., a licensed distributor/retailer of cannabis-related products having cannabis-related waste materials to be disposed of. For example, the Certificate of Destruction may include Client/Generator information including business name, address, contact name, phone number, email, a client ID number allocated to the specific Client/Generator by the Transporter, and the Client/Generator's license number and type. The Client/Generator information may be entered, e.g., via the graphical user interface of control panel 301 on an electronic fillable/printable form integrated with control panel 301, beforehand on an electronic fillable/printable form via a computing device, or manually on a printed form at the onsite location. The Certificate of Destruction further may include Transporter information, e.g., of the user/personnel, including, for example, business name, address, contact name, phone number, email, the Transporter's license/permit number. The Transporter information may be auto-populated beforehand, or filled out manually at the onsite location.

Moreover, the Certificate of Destruction further may include Collection information, e.g., information regarding the cannabis-related waste materials to be disposed of. As shown in FIG. 6, the different types of cannabis-related waste materials to be collected/pulverized may be reduced to an easily understood code, e.g., letter, and the decipher key may be displayed on the Certificate of Destruction for efficient reference. For example, the Collection information codes may include M: post-manufactured biomass (extraction); R: refinement byproduct (winter/distill—fat, wax, terpene; C: cultivation plant material; G: grow medium (soil, coco, rock wool); E: edibles (bulk raw infused food stuff); P: packaged product (non-compliant, defective, expired, retired display); X: unpackaged product (flower, extract, pre-roll, tincture, topical); D: contaminated disposables (gloves, containers, utensils, wipes); WI: wastewater (run-off, reverse osmosis); U: universal waste (light bulbs, batteries, vape pens); O: other materials. As will be understood by a person ordinarily skilled in the art, different codes/letters may be used, and/or additional types of Collection information may be utilized on the Certificate of Destruction. Accordingly, each container/receptacle bin of cannabis-related waste materials collected at the onsite location may be allocated a numerical number, and for each container/receptacle bin, the coded letter identifying the Collection information may be marked, e.g., circled. As many coded letters as necessary may be marked to accurately indicate what types of cannabis-related waste materials are present within the container/receptacle bin. If "0" is marked indicating "other materials" are present in the cannabis-related waste materials, more information regarding the materials may be inputted under "NOTES."

Additionally, track, count, volume, and weight information for each container/receptacle bin may be provided. Accordingly, the user/personnel may perform a visual assessment of the container/receptacle bin and the contents therein to document volume and physical description of the cannabis-related waste materials. Moreover, as described above, data indicative of the weight of the cannabis-related waste materials to be destructed/pulverized within each container/receptacle bin may be electronically received from an electronic scale operatively coupled to lift arm 302, e.g., wirelessly via WiFi or Bluetooth technology, and automatically filled into the appropriate entry on the Certificate of Destruction. Alternatively or additionally, the cannabis-related waste materials to be destructed/pulverized may be weighed manually using a separate scale.

The sum/totals of all the containers/receptacle bins may be calculated and inputted under the total, count, volume, weight section underneath the NOTES section. Upon completion of the Certificate of Destruction, the Client/Generator as well as the user/personnel of the Transporter may print their name(s), sign, date, and time the Certificate of Destruction. Additionally, the user/personnel of the Transporter may include additional information including their driver license number, vehicle license plate number, and make and model of the vehicle, e.g., the mobile rendering vehicle.

While various illustrative embodiments of the invention are described above, it will be apparent to one skilled in the art that various changes and modifications may be made therein without departing from the invention. The appended claims are intended to cover all such changes and modifications that fall within the true scope of the invention.

What is claimed:

1. A method for rendering cannabis-related waste, the method comprising:

obtaining cannabis waste materials;
   obtaining wood materials, the wood materials being non-cannabis material;
   blending the cannabis waste materials and the wood materials to form a blend such that the cannabis waste materials are unrecognizable and unusable; and
   disposing the blend comprising the unrecognizable and unusable cannabis waste materials and the wood materials.

2. The method of claim 1, wherein the cannabis waste materials comprise cannabis plant materials having a level of contaminants rendering it unsuitable for compost.

3. The method of claim 1, wherein the cannabis waste materials comprise at least one of cannabis plant material, cannabis-infused products, mixed packaging, manufacturing byproducts, grow medium, contaminated disposables.

4. The method of claim 1, wherein obtaining the cannabis waste materials comprises receiving the cannabis waste materials at a mobile rendering vehicle.

5. The method of claim 4, wherein blending the cannabis waste materials and the wood materials to form the blend further comprises shredding the cannabis waste materials and the wood materials using a shredder within the mobile rendering vehicle.

6. The method of claim 4, wherein blending the cannabis waste materials and the wood materials to form the blend comprises blending the cannabis waste materials and the wood materials onsite at a licensed premise.

7. The method of claim 6, further comprising transporting the blend via the mobile rendering vehicle offsite to another location different from the licensed premise for disposal.

8. The method of claim 1, wherein the wood materials comprise at least one of wood shavings, wood chips, saw dust, bark, branches, limbs, trunks, stumps, heartwood, or sapwood.

9. The method of claim 1, wherein the wood material comprises a high Carbon content.

10. The method of claim 1, wherein blending the cannabis waste materials and the wood materials comprises blending equal parts of the cannabis waste materials and the wood materials or more of the wood materials than the cannabis waste materials.

11. The method of claim 1, wherein blending the cannabis waste materials and the wood materials further comprises pulverizing the cannabis waste materials and the wood materials such that the cannabis waste materials are unrecognizable and unusable.

12. The method of claim 11, wherein pulverizing the cannabis waste materials and the wood materials comprises pulverizing the cannabis waste materials and the wood materials using a high speed rotor.

13. The method of claim 1, further comprising grinding down the cannabis waste materials prior to blending the cannabis waste materials and the wood materials.

14. The method of claim 1, further comprising grinding down the wood materials prior to blending the cannabis waste materials and the wood materials.

15. The method of claim 1, further comprising removing liquid from the blend.

16. The method of claim 1, further comprising wetting the blend with an amount of liquid sufficient to reduce or prevent dust release.

17. The method of claim 1, further comprising heating the blend to at least 150 degrees Fahrenheit for an amount of time sufficient to sterilize and denature the blend.

18. The method of claim 1, further comprising sterilizing the blend to remove any pathogens and biohazards from the blend.

19. The method of claim 1, further comprising denaturing the blend to break down cannabinoids in the blend.

20. The method of claim 1, wherein the wood materials comprise wood chips.

21. The method of claim 1, wherein the wood materials consist of wood chips.

22. The method of claim 1, wherein the wood materials comprise saw dust.

23. The method of claim 1, wherein the wood materials consist of saw dust.

\* \* \* \* \*